United States Patent [19]
Davis

[11] Patent Number: 5,191,002
[45] Date of Patent: Mar. 2, 1993

[54] METHOD AND COMPOSITIONS FOR A FLOOR CARE MAINTENANCE SYSTEM

[75] Inventor: John B. Davis, Carrollton-Carroll, Ga.

[73] Assignee: Puritan/Churchill Chemical Company, Atlanta, Ga.

[21] Appl. No.: 779,031

[22] Filed: Oct. 18, 1991

[51] Int. Cl.$^5$ ............................................. C08L 31/02
[52] U.S. Cl. .................................... 524/157; 524/145; 252/545; 252/554; 252/174.24; 427/337; 427/340; 427/341; 106/3
[58] Field of Search ............... 524/157, 145; 252/545, 252/554, 174.24, DIG. 2, DIG. 4, DIG. 8; 427/337, 340, 341, 372.2, 385.5, 388.4; 106/3

[56] References Cited

U.S. PATENT DOCUMENTS

| | | | |
|---|---|---|---|
| 3,955,986 | 5/1976 | Miller | 106/11 |
| 4,778,524 | 10/1988 | Chapin | 106/10 |
| 4,859,359 | 8/1989 | DeMatteo et al. | 252/174 |
| 4,923,514 | 5/1990 | Brown | 106/11 |
| 4,960,463 | 10/1990 | Brown | 106/11 |

*Primary Examiner*—Maurice J. Welsh
*Attorney, Agent, or Firm*—Needle & Rosenberg

[57] ABSTRACT

The present invention relates to the discovery of particular water-based emulsion formulations that comprise an environmentally acceptable integrated floor care maintenance system. In particular, the present invention provides a low zinc, low phosphate, acrylic-based, integrated floor care maintenance system that includes a low zinc acrylic floor finish having a zinc content of less than 100 ppm and a phosphate content measured as percent phosphorus of less than 0.4% by weight and a floor finish stripper having no added zinc, no added phosphate and containing from about 0.01 to 5% by weight of an ammonium perfluoroalkylsulfonate wetting and emulsifying agent, such as CAS number 67906-42-7, CAS number 17202-41-4 or a mixture of these. Additionally, this invention provides for a low zinc acrylate floor sealer having a zinc content of less than 100 ppm and a phosphate content measured as percent phosphorus of less than 0.4% by weight, a buffing composition having a zinc content of less than 100 ppm and no added phosphate, and a floor cleaner having no added zinc or phosphate.

19 Claims, No Drawings

METHOD AND COMPOSITIONS FOR A FLOOR CARE MAINTENANCE SYSTEM

BACKGROUND OF THE INVENTION

The present invention relates to an integrated floor care maintenance system that utilizes low zinc or zinc free and/or low phosphate formulations to seal, finish, clean, strip and buff floors. In particular, the invention provides a system in which the components are specifically formulated to lessen the environmental impact associated with conventional acrylic- or acrylic/styrene-based floor care products while simultaneously providing enhanced useful floor care maintenance properties. Thus, the components of the system interact with each other to yield a sealer and finish that are nearly colorless and possess short drying times while exhibiting enhanced gloss properties and reduced noxious odor attributes, a stripper that can more efficiently remove the sealer and finish from the floor surface, and a buffing composition that can more efficiently restore the gloss to a floor surface that has been treated with the finish.

Conventional acrylic- or acrylic/styrene-based floor care maintenance systems use products containing high levels of zinc and/or phosphates in one or more of the system's component formulations. For instance, zinc is typically used as a polymer cross linker to allow efficient stripping of the acrylic polymer and, thus, conventional floor finishes typically contain high levels of zinc, usually from about 4000 to 6000 ppm. Some conventional cleaners contain as much as 10% phosphates. Thus, when a conventional finish is maintained on the floor or stripped from the floor, relatively large quantities of zinc and/or phosphates are introduced into the waste-stream.

However, floor care maintenance systems that employ products containing high levels of zinc and/or phosphate can be detrimental to the environment. High levels of zinc in effluent can inhibit the growth of bacteria and, in particular, the bacteria used in treatment or digestion of sewage. High levels of phosphates can cause algal bloom and increase the aquatic vegetation in lakes and streams. This increased aquatic vegetation lowers the concentration of dissolved oxygen, which is needed to support aquatic wildlife.

Thus, there exists a need for floor care formulations that contain either low concentrations of zinc or are zinc free and low concentrations of phosphates. Recently, low zinc acrylate copolymers, such as NT2624, NT2819 (Rohm & Haas, Philadelphia, PA), ESICryl 20/20 (Emulsion Systems, Lamont IL), Syntran 1905 (Interpolymer, Canton, MA) and NM-91 (Morton, Chicago, IL) have become available. However, introduction of these copolymers into floor care products, such as floor finishes, floor sealers, and buffing compounds, to produce a successful floor care maintenance system requires invention of complementary formulations that are capable of functioning in an integrated, complementary fashion with these products. Because the low zinc acrylate copolymers are not cross-liked with zinc and, therefore, require different strategies for removal, formulations designed to strip the floor sealer and finish are particularly important.

The success of an integrated floor care maintenance system can be measured by determining how the various components of the system perform when tested in industry standardized tests by measuring properties such as leveling, gloss, water resistance, detergent resistance, removability, recoatability, film formation, wet abrasion, powdering, slip resistance, black heel mark resistance, rate of drying, and stability. In addition, other properties, such as a lessened intensity of the color of a finish (when applied and developed as the finish ages), an efficient removal of the finish and sealer by the stripper, a lessened time required by a buffing composition to restore the gloss of the finish, or the lack of offensive odors, are also important determinants of a successful floor care maintenance system.

It has now been found that the environmentally acceptable, low zinc, low phosphate, acrylic-based, integrated floor care maintenance system of the present invention not only lessens the environmental impact associated with conventional acrylic- or acrylic/styrene polymeric systems by releasing negligible or very low amounts of zinc or phosphates into the waste-stream, but also imparts diminished color to the finish and sealer, shortens the drying times for the finish and sealer, increases the gloss of the sealer, reduces the odor associated with the sealer and finish, allows for efficient removal of the sealer and finish from the floor, and shortens the time necessary to achieve a suitable gloss with a buffing composition. It can therefore be appreciated that this integrated floor care maintenance system can be used in a variety of commercial and home settings.

SUMMARY OF THE INVENTION

The present invention relates to the discovery of particular water-based emulsion formulations that comprise an environmentally acceptable integrated floor care maintenance system. In particular, the present invention provides a low zinc, low phosphate, acrylic-based, integrated floor care maintenance system that includes a low zinc acrylic floor finish having a zinc content of less than 100 ppm and a phosphate content measured as percent phosphorus of less than 0.4% by weight and a floor finish stripper having no added zinc, no added phosphate and containing from about 0.01 to 5% by weight of an ammonium perfluoroalkylsulfonate wetting and emulsifying agent, such as CAS number 67906-42-7, CAS number 17202-41-4 or a mixture of these. The ammonium perfluoroalkylsulfonate in combination with a salt of an alkyliminoacid, such as the monosodium salt of isodecyloxypropyliminodipropanoic acid, and a potassium alkyl alkoxy alkanolate, such as Mona NF10 (Mona Industries, Patterson, NJ), both of which act as surfactants, allow for efficient removal of finishes and sealers that contain low zinc acrylate copolymers. Additionally, this invention provides for a low zinc acrylate floor sealer having a zinc content of less than 100 ppm and a phosphate content measured as percent phosphorus of less than 0.4% by weight, a buffing composition having a zinc content of less than 100 ppm and no added phosphate, and a floor cleaner having no added zinc or phosphate.

The present invention represents the culmination of a long series of investigations to discover a complete, integrated floor care maintenance system containing a floor sealer, a floor finish, a floor cleaner, a floor finish stripper a high speed buffing compound and a low speed buffing compound which are formulated specifically to release little or no zinc and phosphates into the environment when used to maintain a floor in the normal manner while at the same time providing improved characteristics compared to conventional systems. Accordingly, it is a specific object of this invention to provide an integrated floor care maintenance system, and a process for using the floor care products, that releases little or no additionally added zinc and phosphates into the environment upon use.

Additionally, it is an object of this invention to provide a full spectrum of low zinc (or zinc free) and low phosphate floor care products that are formulated specifically to provide enhanced beneficial properties when used in conjunction with each other. In particular, it is an object of this invention to provide a floor finish stripper that can efficiently remove the low zinc and low phosphate floor finish and floor sealer of the present invention once they have been applied to a hard surface. It is a further object of this invention to provide a floor finish stripper capable of removing a low zinc and low phosphate floor finish from a hard surface that contains an ammonium perfluoroalkysulfonate as a wetting and emulsifying agent, particularly a floor finish stripper that also contains as surfactants a salt of an alkyliminoacid and a potassium alkyl alkoxy alkanolate.

It is a further object of this invention to provide an integrated floor care maintenance system in which the various component formulations interact with each other to yield a sealer and finish that are nearly colorless and possess short drying times while exhibiting enhanced gloss properties and reduced noxious odor attributes, a stripper that can more efficiently remove the sealer and finish from the floor surface, and a buffing composition that can more efficiently restore the gloss to a floor surface that has been treated with the finish.

While the present invention is susceptible to embodiment in various forms, there are hereinafter described in detail presently preferred embodiments of the present invention, with the understanding that the present disclosure is to be considered as an exemplification of the invention without limitation to the specific embodiments discussed. For instance, although application of the instant floor care system to the surface of a floor is fully disclosed, use of this system on other hard surfaces is also intended.

DETAILED DESCRIPTION OF THE INVENTION

As used herein, the terms "no added zinc" or "no added phosphate" refer to the absence of either zinc or phosphate, respectively, in a formulation although it is recognized that trace amounts of zinc and/or phosphate may be present in constituents that are present in the formulation. For instance, tap water in Atlanta, GA has been tested to contain about 1 ppm zinc; a formulation that contains this water with "no added zinc" will still contain trace amounts of zinc. The term "low zinc" refers to a concentration of zinc that is less than 100 ppm. The term "zinc free" refers to a concentration of zinc that is less than 25 ppm. The term "low phosphate" refers to a phosphate concentration, measured as percent phosphorus, or less than 0.4% by weight. As used herein, an "environmentally acceptable" composition refers to a composition that is low in zinc and low in phosphates.

An "integrated" floor care maintenance system refers to a spectrum of floor care products that are formulated specifically to provide enhanced beneficial properties when used in conjunction with each other and/or are formulated to optimize their performances with respect to each other. A "conventional" floor finish, floor sealer or floor buffer refers to a product that contains an acrylic or acrylic/styrene polymer cross-linked using zinc.

To achieve the foregoing objects and in accordance with its purpose as embodied and broadly described, the present invention relates to a low zinc, low phosphate, acrylic-based, integrated floor care maintenance system that contains, and a floor maintenance process that uses, a low zinc acrylic floor finish having a zinc content of less than 100 ppm and a phosphate content measured as percent phosphorus of less than 0.4% by weight and a floor finish stripper having no added zinc, no added phosphate and containing from about 0.01 to 5% by weight of an ammonium perfluoroalkylsulfonate.

More particular, the low zinc acrylic floor finish of the instant invention is formulated using a low zinc acrylate copolymer as a film forming material. Suitable acrylate copolymers include low zinc acrylate copolymers that do not employ zinc as a cross-linker. Preferred copolymers include NT2624, NT2819 (Rohm & Haas, Philadelphia, PA), ESICryl 20/20 (Emulsion Systems, Lamont IL), Syntran 1905 (Interpolymer, Canton, MA) and NM-91 (Morton, Chicago, IL). The low zinc acrylate copolymer is combined with a plasticizer, preferably tributoxyethyl phosphate; a coalescent, preferably a combination of propanoic acid, 2-methyl monoester with 2,2,4-trimethyl-1,3-pentanediol and diethylene glycol methyl ether; a wetting agent, preferably an ammonium perfluoroalkylsulfonate, more preferably an ammonium perfluoroalkylsulfonate wherein the alkyl group contains 6 to 15 carbons, most preferably a 4:1 mixture of CAS number 67906-42-7 and CAS number 17202-41-4; a resin to enhance gloss, leveling properties and removability, such as an ammonium salt of an acrylic copolymer, preferably Conrez 500 (Morton, Chicago, IL); and an ethylene copolymer to enhance gloss and scuff resistance, slip resistance and buffability; and water to produce a water-based emulsion. Additionally, a silicone type defoamer and a bactericide can be included as desired. Table 1 provides preferred concentration ranges for the constituents of the low zinc floor finish.

TABLE 1

| Component | Floor Finish Approximate Preferred Range % by weight | Approximate More Preferred Range, % by weight |
| --- | --- | --- |
| Water | 50-90 | 65-80 |
| Tributoxyethyl phosphate | 0.1-5 | 0.9-1.9 |
| Ammonium perfluoroalkyl-sulfonate (4:1 CAS 67906-42-7 to CAS 17202-41-4) | 0.05-5 | 0.005-0.1 |
| Propanoic acid, 2-methyl monoester with 2,2,4 trimethyl-1, 3-pentanediol | 0.1-5 | 0.2-1 |
| Low zinc acrylate copolymer | 5-65 | 12-30 |
| Ammonium salt of acrylic copolymer (Conrez 500) | 1-10 | 1-3 |
| Ethylene copolymer | 1-10 | 1-5 |
| Silicone type defoamer | 0-5 | 0.005-0.2 |
| Bactericide | 0-5 | 0.005-0.2 |
| Diethylene glycol methyl ether | 3-7 | 3-7 |

The floor finish stripper of the instant invention is prepared to form a water-based emulsion that includes the following emulsified in water: an ammonium perfluoroalkylsulfonate as a wetting and emulsification agent, preferably an ammonium perfluoroalkylsulfonate wherein the alkyl group contains 6 to 15 carbons, more preferably a 4:1 mixture of CAS number 67906-42-7 and CAS number 17202-41-4; a surfactant, preferably a combination of a salt of an alkyliminoacid (most preferably isodecyloxypropyliminodipropanoic acid, monosodium salt) and potassium alkyl alkoxy alkanolate (most preferably Mona NF10 (Mona Industries, Patterson, NJ); a builder, preferably a combination of sodium metasilicate and alkali metal hydroxide; an alkalinity builder and buffer, preferably monoethanoloamine, and a solvent, preferably 2-butoxyethanol. Additionally, perfume and dyes can be included as desired. Table 2 provides preferred concentration ranges for the constituents of the floor finish stripper.

TABLE 2

Floor Finish Stripper

| Component | Approximate Preferred Range % by weight | Approximate More Preferred Range, % by weight |
|---|---|---|
| Water | 50-95 | 72-86 |
| Sodium metasilicate | 0.5-10 | 1-4 |
| Alkali metal hydroxide | 0.5-10 | 0.5-5 |
| 2-Butoxyethanol | 1-25 | 12-20 |
| Alkyliminoacid, sodium salt (isodecyloxypropylimino-dipropanoic acid, monosodium salt) | 1-10 | 1-5 |
| Potassium alkyl alkoxy alkanolate (Mona NF10) | 1-10 | 1-5 |
| Monoethanolamine | 1-15 | 3-7 |
| Ammonium perfluoroalkylsulfonate (4:1 CAS 67906-42-7 to CAS 17202-41-4) | 0.01-5 | 0.01-0.1 |
| Perfume | 0-0.5 | 0.005-0.5 |
| Dye | 0-0.2 | 0.005-0.2 |

The ammonium perfluoroalkyl sulfonate provides the stripper with an advantage in wetting and emulsification. In particular, the 4:1 mixture of CAS number 67906-42-7 and CAS number 17202-41-4 is effective at extremely low concentrations. The potassium alkyl alkoxy alkanolate (Mona NF10) in combination with the alkyliminoacid salt (isodecyloxypropyliminodipropanoic acid, monosodium salt) exhibit superior surfactant qualities under use conditions and allows this formulation to be less prone to drying. This particular surfactant combination is able to wet and enhance penetration of the finish and seal effectively and prevent the drying of the emulsified film, thus eliminating the necessity of stripping the finish additional time(s) as is frequently necessitated by conventional products. Furthermore, this formulation exhibits surprisingly effective rates of stripping a low zinc floor finish. Thus, although the low zinc floor finish of the instant invention is harder to strip than conventional finishes because it does not contain zinc as a cross-linker, the performance of the instant floor stripper is such that it compensates for this difference in difficulty. Thus, the routine user of the integrated floor care maintenance system would not notice that it is more difficult to strip a low zinc floor finish.

TABLE 3

Floor Sealer

| Component | Approximate Preferred Range % by weight | Approximate More Preferred Range, % by weight |
|---|---|---|
| Water | 10-90 | 74-87 |
| Tributoxyethyl phosphate | 0.1-5 | 0.3-1.8 |

TABLE 3-continued

Floor Sealer

| Component | Approximate Preferred Range % by weight | Approximate More Preferred Range, % by weight |
|---|---|---|
| Diethylene glycol methyl ether | 0.5-7.5 | 1.5-4.5 |
| Ethylene glycol | 0.1-5 | 0.1-1 |
| Ammonium perfluoroalkylsulfonate (4:1 CAS 67906-42-7 to CAS 17202-41-4) | 0.05-5 | 0.005-0.1 |
| Ammonium salt of an acrylic copolymer (Conrez 500) | 0-10 | 0.1-3 |
| Low-zinc acylate copolymer | 5-67 | 10-18 |
| Bactericide | 0-5 | 0.005-0.2 |
| Silicone type defoamer | 0-5 | 0.005-0.2 |

The integrated floor care maintenance system of the instant invention preferably also includes a low zinc acrylic floor sealer having a zinc content of less than 100 ppm and a phosphate content measured as percent phosphorus of less than 0.4% by weight. This floor sealer is formulated by mixing the film forming low zinc acrylate copolymer, preferably NT2624, NT2819 (Rohm & Haas, Philadelphia, PA), ESICryl 20/20 (Emulsion Systems, Lamont IL), Syntran 1905 (Interpolymer, Canton, MA) and NM-91 (Morton, Chicago, IL) with a plasticizer, preferably tributoxyethyl phosphate; a coalescent, preferably diethylene glycol methyl ether; a stabilizer, preferably ethylene glycol; a wetting agent, preferably an ammonium perfluoroalkylsulfonate, more preferably an ammonium perfluoroalkylsulfonate wherein the alkyl group contains 6 to 15 carbons, most preferably a 4:1 mixture of CAS number 67906-42-7 and CAS number 17202-41-4; an ammonium salt of an acrylic copolymer to enhance gloss, leveling properties and removability; and water to form a water-based emulsion. Table 3 provides preferred concentration ranges for the constituents of the low zinc floor sealer. Additionally, the integrated floor care maintenance system of the instant invention can also include a high speed buffing composition having a zinc content of less than 100 ppm and no added phosphate and/or a low speed buffing composition having no added zinc or phosphate. These buffing compositions are also water-based emulsions and are formulated by combining the constituents listed in Tables 4 and 5 in a manner similar to the above emulsions. Both buffing compositions employ nonyl phenoxy poly(ethoxy)ethanol with 9 moles ethylene oxide as a surfactant; the low speed buffing composition employs a quaternary ammonium chloride as an emulsifier and an aliphatic petroleum solvent, preferably Mineral Seal Oil, and poly(ethylene glycol) as lubricants. Preferably, Armorgloss 100 (Amzak), which contains a quaternary ammonium chloride in combination with Mineral Seal Oil can be used.

TABLE 4

High Speed Buffing Compounds

| Component | Approximate Preferred Range % by weight | Approximate More Preferred Range, % by weight |
|---|---|---|
| Water | 30-60 | 68-81 |
| Diethylene glycol methyl ether | 1-10 | 3-7 |
| 2-Butoxyethanol | 1-10 | 3-8 |
| Tributoxyethyl phosphate | 0.1-5 | 0.1-2 |
| Nonyl phenoxy poly(ethoxy)ethanol with 9 moles ethylene oxide | 0.1-3 | 0.1-3 |

TABLE 4-continued

High Speed Buffing Compounds

| Component | Approximate Preferred Range % by weight | Approximate More Preferred Range, % by weight |
|---|---|---|
| Ammonium perfluoroalkylsulfonate (4:1 CAS 67906-42-7 to CAS 17202-41-4) | 0.005-3 | 0.005-0.5 |
| Bactericide | 0-1 | 0.005-0.2 |
| Silicone type defoamer | 0-1 | 0.005-0.2 |
| Low-zinc acrylate copolymer | 5-60 | 12-20 |
| Diethanolamine | 0.1-3 | 0.1-3 |

TABLE 5

Low Speed Buffing Compounds

| Component | Approximate Preferred Range % by weight | Approximate More Preferred Range, % by weight |
|---|---|---|
| Water | 50-95 | 89-95 |
| Aliphatic petroleum solvent (Mineral Seal Oil) | 0.1-3 | 0.01-0.2 |
| Quaternary ammonium chloride | 0.1-3 | 0.01-0.2 |
| Poly (ethylene glycol) | 1-10 | 1.5-5 |
| Nonyl phenoxy poly(ethoxy)ethanol with 9 moles ethylene oxide | 3-15 | 0.1-1.5 |
| Perfume | 0-3 | 0.005-0.5 |
| Dye | 0-1 | 0.005-0.2 |

TABLE 6

Floor Cleaner

| Component | Approximate Preferred Range % by weight | Approximate More Preferred Range, % by weight |
|---|---|---|
| Water | 50-95 | 83-94 |
| Acrylate copolymer | 0-8 | 0.2-1 |
| Alkali metal hydroxide | 0-5 | 0.01-0.2 |
| Nonyl phenoxy poly(ethoxy)ethanol with 9 moles ethylene oxide | 1-20 | 1-10 |
| Bactericide | 0-5 | 0.005-0.2 |
| Dye | 0-1 | 0.005-0.2 |
| Perfume | 0-3 | 0.005-0.2 |

Finally, the integrated floor care maintenance system of the instant invention can also include a floor cleaner having no added zinc or phosphate. Table 6 provides preferred concentration ranges for the constituents of the floor cleaner.

The integrated floor care maintenance system of the instant invention is used in the following manner. The low zinc floor sealer is applied to a clean, dry and/or newly stripped floor using thin, even coats. A clean, damp, rayon or cotton mop or the like can be used to apply the sealer. The sealer is allowed to dry thoroughly between coats. One to three coats of sealer may be applied.

The low zinc floor finish is applied in thin, even coats over the sealer coat(s). The finish may be applied to an unsealed floor. The finish may be applied with a clean, cotton or rayon mop or the like and allowed to dry thoroughly between coats. Typically, three to five coats of finish are applied.

On a daily basis or as needed, the floor should be damp mopped with a solution of the floor cleaner (1-3 oz. per gallon) to remove any dirt or grit from the floor. After allowing to dry, the floor should be buffed to remove any scuffs or scratches from the surface and restore the gloss. The floor can be buffed with either a low speed or high speed buffing machine. If using a low speed buffer, the floor in the path of the buffer should be sprayed with the low speed buffing compound to lubricate the pad and facilitate repair. If using the high speed buffer, the floor must be mopped with a solution of the high speed buffing compound. After the floor has dried, it is buffed with a high speed buffer to restore the shine.

When necessary, the floor can be stripped with the floor finish stripper. A solution of the stripper is liberally mopped on the floor and allowed to stand 10 to 15 minutes. If desired, the finish can be agitated to facilitate removal with a low speed buffer and a brown or black pad. After the application, the stripping solution is scrubbed and simultaneously removed from the floor using a wet vacuum. The stripper may also be mopped up. Preferably, the floor is then rinsed twice with clean water, mopping or vacuuming up after each rinse. After the floor has dried completely, the sealer and finish can be applied.

The performance properties of the instant integrated floor care maintenance system were measured by testing the various components of the system perform using industry standardized tests. Measurement of leveling, gloss, water resistance, detergent resistance, removability, recoatability, film formation, wet abrasion, powdering, slip resistance, black heel mark resistance, rate of drying, and stability revealed that the instant system performs as well or better than conventional systems.

Additionally, this floor care maintenance system provides advantages over conventional systems. The color of the finish was compared by visual inspection to conventional types of finishes, such as those readily available on the market; the color of the instant finish appears to be considerably lighter than the conventional systems. Furthermore, experiments indicate that after a year's time aging and with as many as 40 coats of finish, the instant finish provides a very light color on the floor.

The particular combination and ratio of resin to coalescents used in the floor finish and floor sealer allow for a decreased drying time. Experiments indicate that the floor sealer and the floor finish are dry and ready to receive additional coats in up to 15% less time than conventional products.

Furthermore, the gloss build appears to be enhanced compared to conventional products. As coats of floor finish are applied, the gloss of the floor increases. Comparisons of equivalent coats of the instant floor finish and conventional finishes show that the instant floor finish possesses up to 18% higher gloss for the first coat of finish. Because of this differential in gloss build, only 1 or 2 coats of the new formulation are needed to meet the customers minimum acceptable level of gloss as opposed to the standard 3 coats of conventional finish. Thus, the instant floor finish is capable of saving the customer both money and time.

Because the choices made for the solvent (Mineral Seal Oil) and quaternary ammonium chloride emulsifier of the low speed buffing composition, a lessened time is required by a buffing composition to restore the gloss of the finish. The solvent must be volatile enough to ensure a solvent layer is not left on the floor causing it to be slippery; however, the solvent must remain on the floor to lubricate the buffing pad sufficiently. The quaternary ammonium chloride emulsifies the composition at low levels without leaving a sticky residue on the floor.

Importantly, the floor sealer composition and the floor finish composition are formulated to reduce the overall odor. This is a valuable property, especially when the products need to be used in the presence of individuals who are sensitive to the odor, such as hospital patients. While ammonia is present in many raw material, including polymers, resins and some waxes, ammonia is not present in the low zinc acrylate copolymers. Furthermore, the particular resin, Conrez 500 (Morton, Chicago, IL), used in the sealer and finish appears to form a stronger bond with ammonia leading to a lessened concentration of ammonia emitted from the formulations. Thus, even though comparable amounts of ammonia may be present in the new sealer and finish compositions as opposed to conventional formulations, the overall ammonia odor is diminished.

Numerous modifications and variations of the present invention are possible in light of the above teachings. It is therefore to be understood that within the scope of the appended claims, the invention may also be practice otherwise than as specifically described herein.

What is claimed is:

1. A kit for a low zinc, low phosphate, acrylic-based, integrated floor care maintenance system comprising:
   A) a low zinc acrylic floor finish having a zinc content of less than 100 ppm and a phosphate content measured as percent phosphorus of less than 0.4% by weight; and
   B) a floor finish stripper having no added zinc, no added phosphate and comprising from about 0.01 to 5% by weight of an ammonium perfluoroalkylsulfonate.

2. The kit of claim 1, further comprising a low zinc acrylic floor sealer having a zinc content of less than 100 ppm and a phosphate content measured as percent phosphorus of less than 0.4% by weight.

3. The kit of claim 1, further comprising a buffing composition having a zinc content of less than 100 ppm and no added phosphate.

4. The kit of claim 1, further comprising a floor cleaner having no added zinc or phosphate.

5. The kit of claim 1, wherein the ammonium perfluoroalkylsulfonate is selected from the group consisting of CAS number 67906-42-7, CAS number 17202-41-4 and a mixture thereof.

6. The kit of claim 1, wherein the floor finish stripper further comprises from about 1 to 10% by weight of an alkyliminoacid, sodium salt surfactant.

7. The kit of claim 6, wherein the alkyliminoacid, sodium salt surfactant comprises isodecyloxypropyliminodipropanoic acid, monosodium salt.

8. The kit of claim 1, wherein the floor finish stripper further comprises from about 1 to 10% by weight of a potassium alkyl alkoxy alkanolate surfactant.

9. The kit of claim 1, wherein each element of the kit is zinc free.

10. A floor finish stripper composition for removing a low zinc acrylic finish or low zinc sealer from a floor, comprising:
    A) ammonium perfluoroalkylsulfonate, wherein the ammonium perfluoroalkylsulfonate is present at a concentration from about 0.01 to 5% by weight;
    B) alkyliminoacid, sodium salt surfactant, wherein the alkyliminoacid, sodium slat surfactant is present at a concentration from about 1 to 10% by weight; and
    C) potassium alkyl alkoxy alkanolate, wherein the potassium alkyl alkoxy alkanolate is present at a concentration from about 1 to 10% by weight.

11. The floor finish stripper of claim 10, wherein the ammonium perfluoroalkylsulfonate is selected from the group consisting of CAS number 67906-42-7, CAS number 17202-41-4 and a mixture thereof and the alkyliminoacid, sodium salt surfactant comprises isodecyloxypropyliminodipropanoic acid, monosodium salt.

12. An environmentally acceptable process for maintaining a floor surface, comprising the steps of:
    A) applying a low zinc acrylic floor finish having a zinc content of less than 100 ppm and a phosphate content measured as percent phosphorus of less than 0.4% by weight; and
    B) periodically removing the floor finish by applying a floor finish stripper having no added zinc, no added phosphate and comprising from about 0.01 up 5% by weight of an ammonium perfluoroalkylsulfonate.

13. The process of claim 12, further comprising the step of sealing the floor with a low zinc acrylic floor sealer having a zinc content of less than 100 ppm and a phosphate content measured as percent phosphorus of less than 0.4% by weight before applying the floor finish.

14. The process of claim 12, further comprising the step of buffing the floor with a buffing composition having a zinc content of less than 100 ppm and no added phosphate after applying the floor finish.

15. The process of claim 12, further comprising the step of cleaning the floor after the floor finish is applied with a floor cleaner having no added zinc or phosphate.

16. The process of claim 12, wherein the ammonium perfluoroalkylsulfonate is selected from the group consisting of CAS number 67906-42-7, CAS number 17202-41-4 and a mixture thereof.

17. The process of claim 12, wherein the floor finish stripper further comprises from about 1 to 10% by weight of an alkyliminoacid, sodium salt surfactant.

18. The process of claim 17, wherein the alkyliminoacid, sodium salt surfactant comprises isodecyloxypropyliminodipropanoic acid, monosodium salt.

19. The process of claim 12, wherein the floor finish stripper further comprises from about 1 to 10% by weight of a potassium alkyl alkoxy alkanolate surfactant.

* * * * *